Jan. 3, 1956     K. L. LEE     2,729,716
AUTOMOBILE AUTOMATIC AND MANUAL CIRCUIT BREAKER
Filed May 22, 1953     2 Sheets-Sheet 1
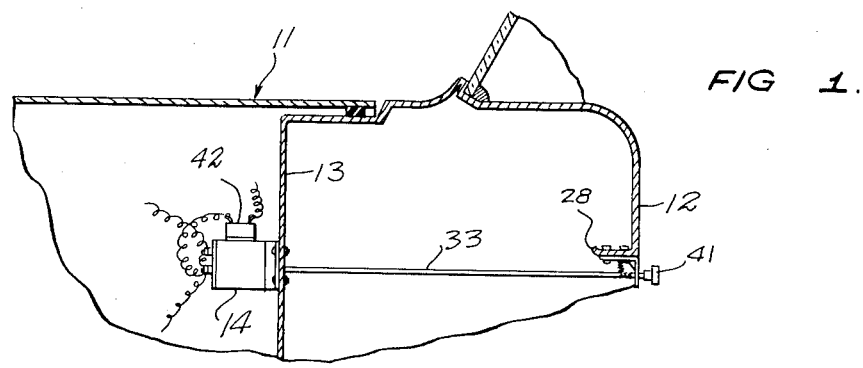
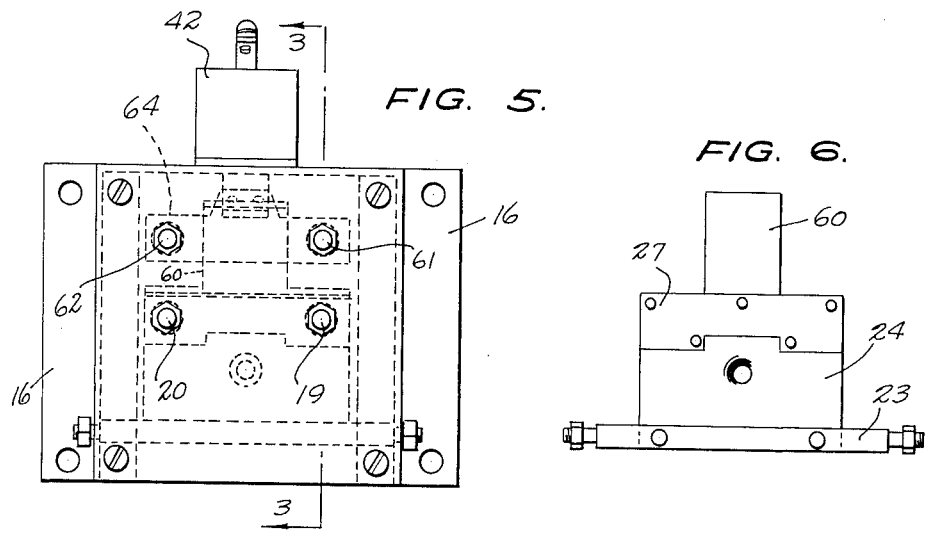
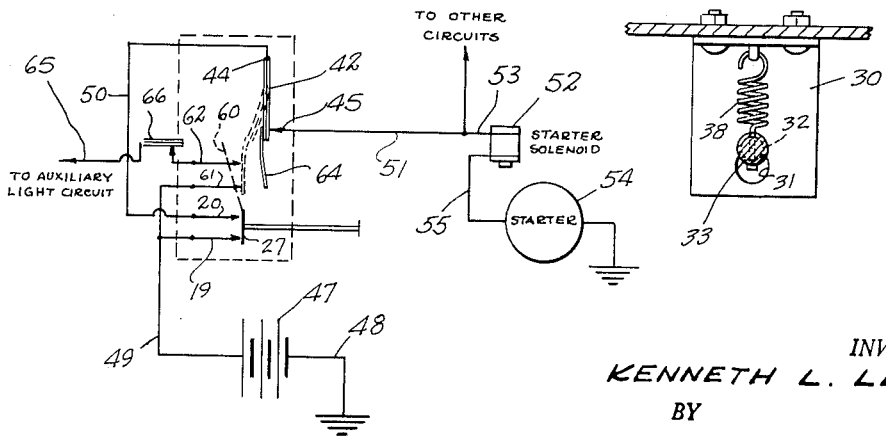
INVENTOR.
KENNETH L. LEE,
BY
McMorrow, Berman & Davidson
ATTORNEYS.

Jan. 3, 1956  K. L. LEE  2,729,716
AUTOMOBILE AUTOMATIC AND MANUAL CIRCUIT BREAKER
Filed May 22, 1953  2 Sheets-Sheet 2
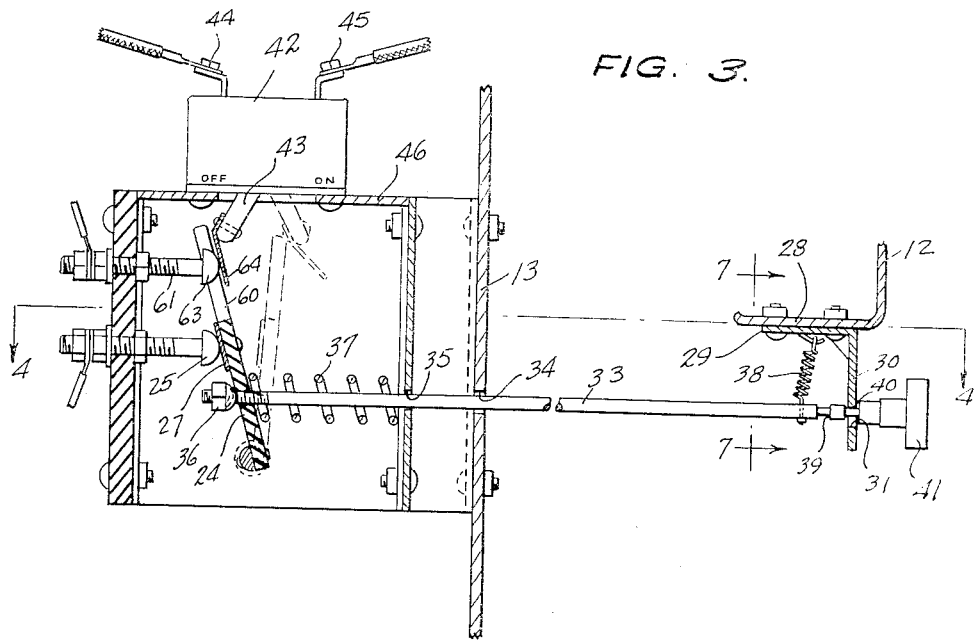
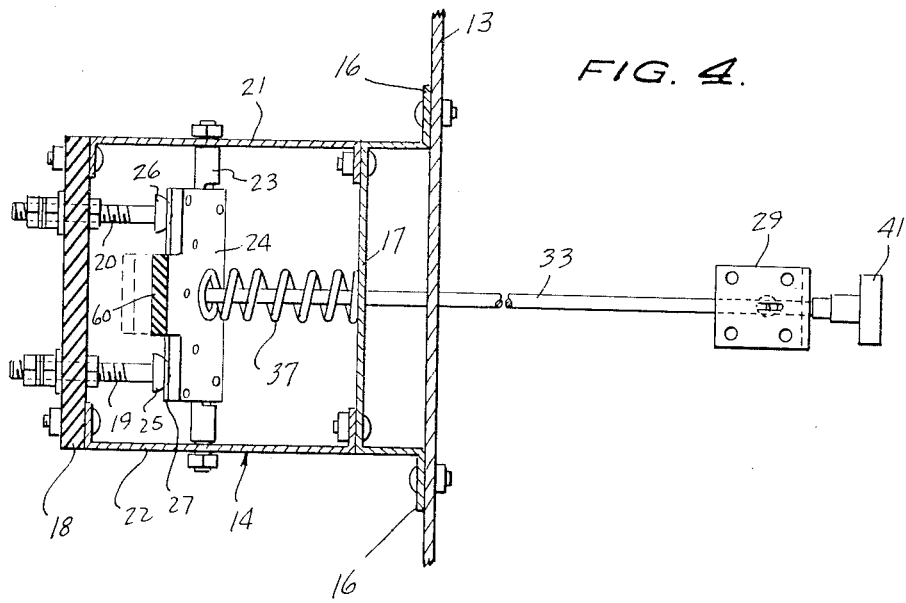
INVENTOR.
KENNETH L. LEE,
BY
McMorrow, Berman + Davidson
ATTORNEYS.

United States Patent Office 2,729,716
Patented Jan. 3, 1956

2,729,716

AUTOMOBILE AUTOMATIC AND MANUAL CIRCUIT BREAKER

Kenneth L. Lee, Stevenson, Ala.

Application May 22, 1953, Serial No. 356,800

4 Claims. (Cl. 200—114)

This invention relates to automobile safety switch systems, and more particularly to an improved means for automatically opening the battery circuit of an automobile whenever a fault occurs therein producing excessive current in the battery circuit, said means being provided with a manually controlled reset device which may be also employed as a manual master switch for the battery circuit.

A main object of the invention is to provide a novel and improved battery circuit for an automobile including both an automatically operating circuit breaker and a manually operated device for resetting the circuit breaker and for manually opening and closing the battery circuit, the improved system involving simple components, being reliable in operation, and greatly increasing the safety of operation of the motor vehicle on which it is installed.

A further object of the invention is to provide an improved battery circuit for an automobile which includes an automatically operating circuit breaker which opens the circuit responsive to the presence of a fault producing excessive current in the battery circuit, and which also includes manually controlled means for resetting the circuit breaker, as well as for locking the circuit in an open position if so desired by the automobile operator, the improved system involving inexpensive parts, being easy to install on an automobile, and being durable in construction.

Further objects and advantages of the invention will become apparent from the following description and claims, and from the accompanying drawings, wherein:

Figure 1 is a vertical cross sectional view taken through the instrument panel of an automobile provided with an improved battery circuit according to the present invention, showing the manner in which the elements of the invention are installed on an automobile.

Figure 2 is a schematic wiring diagram of the automobile battery circuit of the present invention.

Figure 3 is an enlarged vertical cross sectional view taken longitudinally through the switch housing of the system of Figure 1 and showing the various elements of the system with the circuit breaker in its open-circuit position.

Figure 4 is a horizontal cross sectional view taken on the line 4—4 of Figure 3.

Figure 5 is a forward end elevational view of the assembly illustrated in Figures 3 and 4.

Figure 6 is an elevational detail view of the armature of the switch device.

Figure 7 is an enlarged cross sectional detail view taken on the line 7—7 of Figure 3.

Referring to the drawings, 11 designates an automobile of conventional construction having the instrument panel 12 and having the fire wall 13 separating the engine compartment of the motor vehicle from the passenger compartment. Designated at 14 is a support in the form of a generally rectangular housing which is open at its bottom and which is secured to the fire wall 13 forwardly thereof by means of the vertical flanges 16, 16 formed at the respective opposite vertical margins of the rear vertical wall 17 of the housing 14. The forward vertical wall of the housing is designated at 18 and is made of insulating material, such as plastic material or the like and secured in said forward wall 18 are the spaced, horizontally aligned terminal bolts 19 and 20.

Rotatably mounted in the lower portions of the side walls 21 and 22 of the housing 14 is the transverse horizontal shaft member 23 to which is secured the upstanding, generally rectangular plate 24 of suitable insulating material. Secured on the upper portion of the plate 24 facing the respective heads 25 and 26 of the terminal bolts 19 and 20 is a conductor strip 27 which is engageable with the terminal heads 25 and 26 and which is adapted to electrically connect said terminal heads when the plate 24 is in the position thereof shown in Figures 3 and 4.

Secured to and depending from the bottom flange 28 of the instrument panel 12 is a bracket member 29 having the vertical arm 30. The arm 30 is formed with a generally keyhole-shaped aperture 31 in its lower portion, said aperture having the reduced notch element 32 at its top end, as shown in Figure 7. Designated at 33 is the manual control rod which extends through the aperture 31, through an aperture 34 in the fire wall 13, and through an aperture 35 in the rear wall 17 of the housing 14, and centrally through the plate 24, said rod being provided at its forward end with the pivot nut 36, as shown in Figure 3. Designated at 37 is a coiled spring which surrounds the rod 33 bearing between the wall 17 and the plate 24, and biasing said plate counterclockwise, as viewed in Figure 3, into engagement with the heads 25 and 26 of the terminal bolts 19 and 20. As shown in Figure 3, coiled spring 37 acts to normally bias the conductor strip 27 into bridging contact with the terminal heads 25 and 26.

The rear end portion of the operating rod 33 is resiliently connected to the horizontal top arm of bracket 29 by a coiled spring 38 which biases the rear end portion of rod 33 upwardly. The rear end portion of rod 33 is formed with the spaced annular grooves 39 and 40 which are selectively lockingly engageable in the reduced notch 32 of the aperture 31 to lock the rod 33 in either one of two selected positions, one of said positions being shown in Figure 3, wherein the groove 40 is engaged in the notch 32, whereby the plate 24 is held in its circuit-closing position, wherein the strip 27 bridges the terminal heads 25 and 26. When the groove 39 of rod 33 is engaged in the notch 32, the plate 24 is held in circuit-breaking position, the rod 33 being provided at its rear end with the knob 41 for manually moving said rod. It will be apparent that when the operator desires to move the rod 33, he depresses the knob 41, disengaging the grooved portion of the rod 33 from the notch 32, whereby the rod may be moved freely through the larger portion of aperture 31, to reseat the rod with the selected groove 39 or 40 thereof in engagement with the notch 32.

Designated at 42 is a conventional thermal overload switch which may be closed by moving its reset lever 43 into the dotted view position shown in Figure 3 and which opens automatically when current in excess of a predetermined value flows through the switch between its terminals 44 and 45. When the switch opens, the reset lever 43 thereof moves to the full line position shown in Figure 3. As will be apparent from Figure 3, the thermal overload switch 42 is mounted on the top wall 46 of housing 14 with the reset lever 43 thereof disposed rearwardly adjacent an upwardly directed extension lug 60 formed on the intermediate portion of the top edge of plate 24. As shown in Figure 3, the reset lever 43 is on the side of plate lug 60 opposite the terminal heads 25 and 26. Furthermore, the switch 42 is so arranged that when said switch opens responsive to an overload of current therethrough, the reset lever 43 moves into the full line position thereof shown in Figure 3, wherein said reset lever is closely adjacent the upper portion of the lug 60. Thus, with the plate 24 in the position thereof shown in Figure 3, the thermal overload switch 42 may be reset by releasing the operating rod 33, as above described, and retracting the rod 33 to rotate the plate 24 to its open-circuit position, namely, clockwise, as viewed in Figure 3. This operation breaks the circuit between the terminal heads 25 and 26 but at the same time rotates the reset lever 43 to the dotted line position thereof shown in Figure 3, wherein the thermal overload switch 42 is closed. Therefore, should the fault or other defect which produces the thermal overload still be present in the circuit, when the contact strip 27 is again brought into bridging engagement with the terminal heads 25 and 26, as by returning the control rod 33 to the position thereof shown in Figure 3, the thermal overload switch 42 will again open.

Secured on the insulating wall 18 of housing 14 above the terminals 19 and 20 are additional terminal bolts 61 and 62, said terminal bolts being provided with the contact heads 63 similar to the contact heads 25 and 26 on the terminal bolts 19 and 20. Secured to the reset lever 43 is the depending resilient contact spring 64 of conductive material, such as resilient metal or the like, said spring 64 projecting laterally on opposite sides of the reset lever 43, as shown in Figure 5, and being arranged to conductively engage the contact heads 63 of the terminal bolts 61 and 62 when the reset lever 43 has been moved to its open-circuit position, shown in full line view in Figure 3. As shown in Figure 5, the upstanding lug 60 on the top edge of plate 24 is disposed between the terminal bolts 61 and 62, whereby the lug 60 may be moved to the full line position thereof shown in Figure 3 without interference from the terminal bolts 61 and 62.

Referring now to Figure 2, the automobile battery is designated at 47. In a typical installation, one terminal of the battery 47 is grounded, as by a wire 48 and the opposite terminal of the battery is connected by a wire 49 to the terminal bolts 19 and 61. The terminal bolt 20 is connected by a wire 50 to the terminal 44 of the thermal overload switch 42, and the terminal 45 of the switch 42 is connected to a wire 51 leading to the various circuits of the automobile. Thus, the starter solenoid 52 may be connected in the usual manner to the wire 51, as by a wire 53, and the automobile starting motor 54 may be connected to the energizing contact of the starter solenoid 52 by a wire 55 in the conventional manner. The ignition and other circuits of the automobile are connected to the wire 51.

If a ground occurs in any of the circuits connected to the wire 51, the thermal overload switch 42 will open, in the manner above described, and may be reset by rotating plate 24 clockwise, as viewed in Figure 3, by means of the operating rod 33 in the manner above described.

If at any time, the operator of the vehicle for any reason, wishes to open the battery circuit of the vehicle, as for example to prevent fire hazards during the period in which a vehicle is parked and is unattended, he operates the control rod 33 in the manner above described, to rotate the plate 24 clockwise, from the position thereof shown in Figure 3, to a position wherein the terminal heads 25 and 26 are disconnected, the control rod 33 being locked in this position by engaging the groove 39 in the notch 32.

Designated at 65 is a wire which is connected to the terminal bolt 62 through a thermal overload switch 66. The wire 65 is connected to the ungrounded terminals of the vehicle headlamps and may include a suitable manually controlled switch. Thus, when the reset lever 43 moves to its open-circuit position, shown in full line view in Figure 3, the contact spring 64 bridges the terminal bolts 61 and 62, thereby connecting the ungrounded battery wire 49 to the headlamp wire 65 through the switch 66, whereby the headlamps may be energized independently of the other circuits of the vehicle, assuming that no short circuits are present in said headlamps. It will be understood that the wire 65 is an auxiliary supply wire for the headlamps, the headlamps being normally energized through a suitable supply wire connected to the main battery wire 51. Thus, should the reset lever 43 be rotated to the full line position thereof shown in Figure 3, as by a short circuit in one of the circuits of the vehicle other than the headlamp circuit, the headlamps may still be energized since the auxiliary wire 65 will be connected to the battery wire 49 through the conductive spring 64, which bridges the terminal bolts 61 and 62. Thus the headlamps may be operated at night when the circuit breaker 42 has opened as a result of a short circuit in one of the other electrical circuits of the vehicle.

While a specific embodiment of an improved automatic and manual circuit breaking system for a motor vehicle has been disclosed in the foregoing description, it will be understood that various modifications within the spirit of the invention may occur to those skilled in the art. Therefore, it is intended that no limitations be placed on the invention except as defined by the scope of the appended claims.

What is claimed is:
1. In a motor vehicle, a circuit including a source of current, a support, a thermal overload circuit breaking device mounted on the support and connected in said circuit, said thermal overload device having a pivoted reset arm normally in a circuit-closing position and being rotated to a circuit-opening position responsive to excessive current through the thermal overload device, a pair of stationary contacts mounted on said support means connecting said contacts into said circuit, a conductive plate pivoted to said support, means biasing said plate into bridging relation to said contacts, the free end of said plate being disposed adjacent the said circuit-opening position of said reset arm, and an operating member connected to said plate for manually rotating said plate away from said contacts, said reset arm being disposed on the side of said plate opposite said contacts, and means whereby said arm is engaged by and rotated to said circuit-closing position when the plate is rotated away from said contacts.

2. In a motor vehicle, a circuit including a source of current, a support, a thermal overload circuit breaking device mounted on the support and connected in said circuit, said thermal overload device having a pivoted reset arm normally in a circuit-closing position and being rotated to a circuit-opening position responsive to excessive current through the thermal overload device, a pair of stationary contacts mounted on said support, means connecting said contacts into said circuit, a conductive plate pivoted to said support, means biasing said plate into bridging relation to said contacts, the free end of said plate being disposed adjacent the said circuit-opening position of said reset arm, an opearting rod connected to said plate for manually rotating said plate away from said contacts, said reset arm being disposed on the side of said plate opposite said contacts, means whereby said arm is engaged by and is rotated to said circuit-closing position when the plate is rotated away from said contacts, a bracket member disposed adjacent and engaging said operating rod, and interengaging locking means on said bracket member and operating rod.

3. In a motor vehicle, a circuit including a source of current, a support, a thermal overload circuit breaking device mounted on the support and connected in said circuit, said thermal overload device having a pivoted reset arm normally in a circuit-closing position and being rotated to a circuit-opening position responsive to excessive current through the thermal overload device, a pair of stationary contacts mounted on said support, means connecting said contacts into said circuit, a conductive plate pivoted to said support, means biasing said plate into bridging relation to said contacts, the free end of said plate being disposed adjacent the said circuit-opening position of said reset arm, an operating rod connected to said plae for manually rotating said plate away from said contacts, said reset arm being disposed on the side of said plate opposite said contacts, means whereby said arm is engaged by and is rotated to said circuit-closing position when the plate is rotated away from said contacts, a bracket member disposed adjacent said operating rod, said bracket member being formed with a keyhole aperture having a relatively large portion and a smaller portion, said rod being formed with spaced annular grooves, the rod extending through said aperture and being freely movable in said larger portion, and said grooves being lockingly engageable in said smaller portion to releasably lock the rod, and spring means biasing said rod toward said smaller portion.

4. In a motor vehicle, a circuit including a source of current, a support, a thermal overload circuit breaking device mounted on the support and connected in said circuit, said thermal overload device having a pivoted reset arm normally in a circuit-closing position and being rotated to a circuit-opening position responsive to excessive current through the thermal overload device, a pair of stationary contacts mounted on said support, means connecting said contacts into said circuit, a conductive plate pivoted to said support, means biasing said plate into bridging relation to said contacts, the free end of said plate being disposed adjacent the said circuit-opening position of said reset arm, an operating member connected to said plate for manually rotating said plate away from said contacts, said reset arm being disposed on the side of said plate opposite said contacts, means whereby said arm is engaged and is rotated to said circuit-closing position when the plate is rotated away from said contacts, a second pair of contacts mounted on said support, an auxiliary circuit connected to said source of current and including said second pair of contacts, and a conductive member on said reset arm and being movable into bridging engagement with said second pair of contacts when said reset arm moves to said circuit-opening position.

References Cited in the file of this patent

UNITED STATES PATENTS

| | | |
|---|---|---|
| 645,902 | Sperry | Mar. 20, 1900 |
| 1,158,355 | Willis | Oct. 26, 1915 |
| 1,159,547 | Tate | Nov. 9, 1915 |
| 1,316,372 | Liebreich | Sept. 16, 1919 |
| 2,132,629 | Jackson | Oct. 11, 1938 |
| 2,148,295 | Hays | Feb. 21, 1939 |
| 2,253,911 | Matsukawa | Aug. 26, 1941 |
| 2,335,082 | Platz | Nov. 23, 1943 |
| 2,340,877 | Hausler | Feb. 8, 1944 |
| 2,478,541 | McCracken | Aug. 9, 1949 |
| 2,577,960 | Ginard | Dec. 11, 1951 |